United States Patent
Seo

(10) Patent No.: US 6,222,833 B1
(45) Date of Patent: Apr. 24, 2001

(54) DEVICE AND METHOD FOR MULTIUSER DETECTION IN DS-CDMA SYSTEM

(75) Inventor: Kyung Sam Seo, Seoul (KR)

(73) Assignee: LG Communications & Information, Ltd., Seoul (KR)

( * ) Notice: Subject to any disclaimer, the term of this patent is extended or adjusted under 35 U.S.C. 154(b) by 0 days.

(21) Appl. No.: 08/997,995

(22) Filed: Dec. 24, 1997

(30) Foreign Application Priority Data

Dec. 22, 1997 (KR) .................................................. 97/71798

(51) Int. Cl.[7] .................................................. H04B 7/216
(52) U.S. Cl. .............................................. 370/342; 375/143
(58) Field of Search .................................. 370/203, 320, 370/335, 342, 441, 479; 375/142, 143, 144, 148, 150, 152, 260, 343

(56) References Cited

U.S. PATENT DOCUMENTS

| | | | |
|---|---|---|---|
| 4,470,138 | * 9/1984 | Gutleber | 370/342 |
| 5,363,403 | * 11/1994 | Schilling et al. | 370/441 |
| 5,463,660 | * 10/1995 | Fukasawa et al. | 370/342 |
| 5,467,368 | * 11/1995 | Takeuchi et al. | 375/206 |
| 5,553,062 | * 9/1996 | Schilling et al. | 370/479 |
| 5,579,304 | * 11/1996 | Sugimoto et al. | 370/342 |
| 5,719,852 | * 2/1998 | Schilling et al. | 370/201 |
| 5,956,333 | * 9/1999 | Zhou et al. | 370/342 |
| 6,014,373 | * 1/2000 | Schilling et al. | 370/342 |

* cited by examiner

*Primary Examiner*—Chi H. Pham
*Assistant Examiner*—Kwang B. Yao
(74) *Attorney, Agent, or Firm*—Fleshner & Kim, LLP

(57) ABSTRACT

A device and method for a multiuser detection in a DS-CDMA system largely reduces an amount of data computation while reducing noise due to MAI. The method for a multiuser detection in a DS-CDMA system includes the steps of receiving a band-spread signal by a plurality of spreading codes respectively transmitted by each of multiusers, obtaining a plurality of sampled outputs from each of multiuser's messages by despreading the received signal with a matched filter, obtaining an MAI signal included in the plurality of sampled outputs by applying a minus (−) value of a cross-correlation value between the multiuser's spreading codes to the plurality of sampled outputs, removing the MAI signal from the sampled outputs by subtracting the MAI signal from the sampled outputs, and generating a binary data by comparing the sampled outputs from which the MAI signal is to be removed with a threshold value to recover the multiuser's messages.

9 Claims, 3 Drawing Sheets

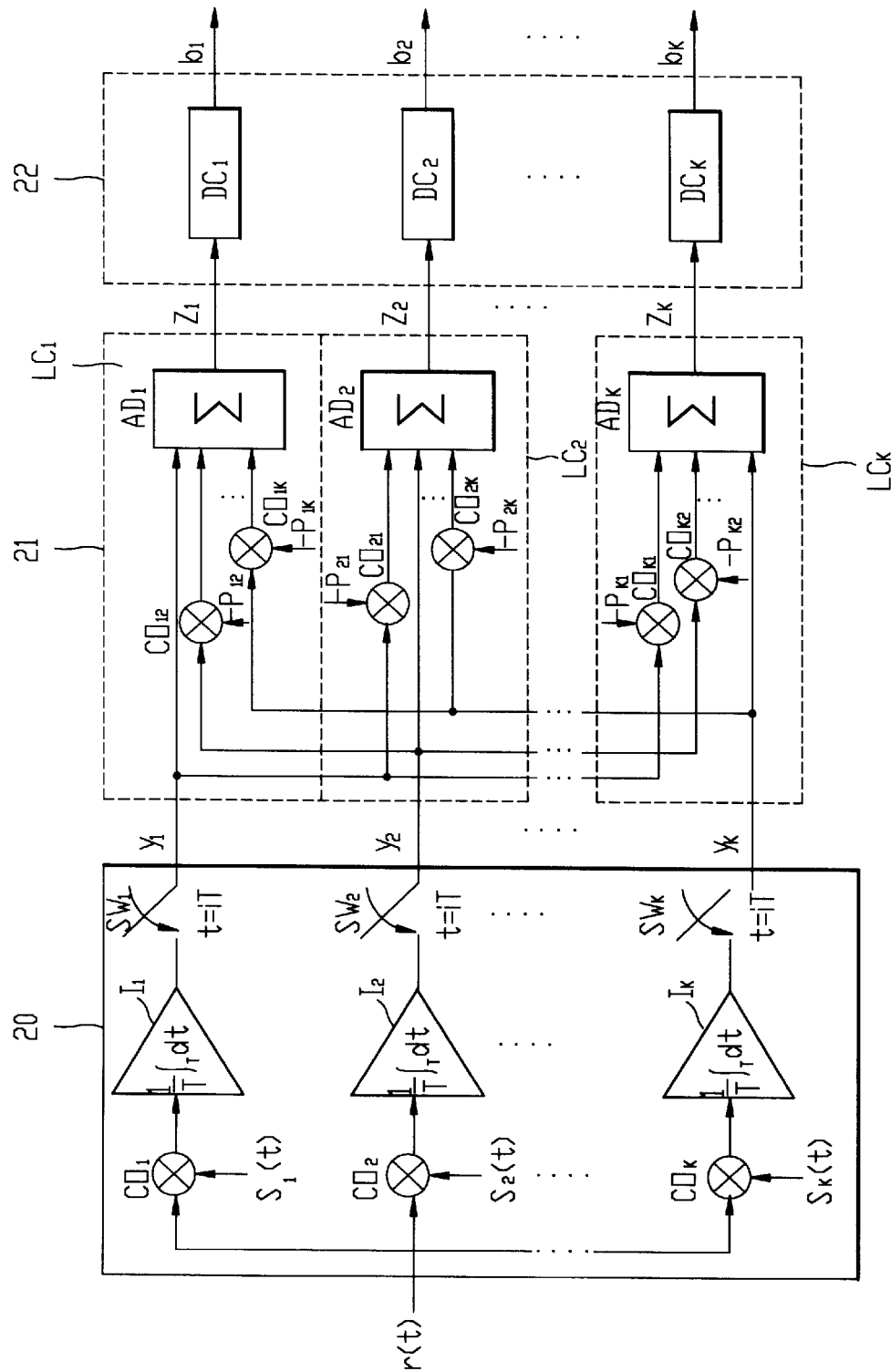
F I G. 2

DEVICE AND METHOD FOR MULTIUSER DETECTION IN DS-CDMA SYSTEM

BACKGROUND OF THE INVENTION

1. Field of the Invention

The present invention is related to a device and method for a multiuser detection in a DS-CDMA (Direct Sequence-Code Division Multiple Access) system, and more particularly, to a device and method for a decorrelating multiuser detection in a DS-CDMA system which allows real time removal of an MAI (Multiple Access Interference) occurred in the DS-CDMA system.

2. Discussion of the Related Art

The DS-CDMA system is a system in which a transmitter modulates and transmits its message by making a direct band spreading with a pseudo noise (PN) code or a spreading signal (code) assigned to multiusers individually for distinguishing between the multiusers, and a receiver restores an originally transmitted message by receiving the transmitted signal and by despreading the transmitted signal with the spreading code. Since the DS-CDMA system has many merits, such as strong in multipath fading, good utilization of voice activity cycles, availability of soft handoff between base stations, strong in jamming, and reuse of one frequency band, which reuse allows the DS-CDMA system to have a greater capacity over conventional systems, the DS-CDMA systems has been spot lighted in implementation of cellular and personal communications, recently. Despite the aforementioned merits of the DS-CDMA system, because its performance is restricted by MAI occurred at multiuser reception or great SNR (signal to noise ratio), ceaseless efforts have been concentrated on removing the MAI, and thus various multiuser detectors have been proposed up to now.

As a typical one of the multiuser detector, there is a decorrelating multiuser detector as shown in FIG. 1, provided with a matched filter block 10 having a plurality of multipliers ($CO_1$–$CO_K$), a plurality of integrators ($I_1$–$I_K$), and a plurality of switches ($SW_1$–$SW_K$) for despreading a received signal r(t) with multiuser' spreading codes to provide a sample of each message of the multiuser, a $R^{-1}$ filter 11 for filtering the samples in the matched filter block 10 to remove an MAI signal included in each of the samples of the multiuser's messages, and a binary data determining part 12 having a plurality of determiners ($DC_1$–$DC_K$) for comparing plural outputs ($Z_1$–$Z_K$) corresponding to the multiuser of the $R^{-1}$ filter 11 with a threshold voltage to determine binary outputs ($b_1$–$b_K$).

The operation of the background art decorrelating multiuser detection will be described.

The received signal r(t) input to the decorrelating multiuser detector is despread through the plurality of matched filters in the matched filter block 10 having the plurality of multipliers ($CO_1$–$CO_K$), integrators ($I_1$–$I_K$) and switches ($SW_1$–$SW_K$) and each of the original messages of the multiuser is recovered. The outputs ($y_1$–$y_K$) of the matched filter block 10 can be expressed as a matrix as follows.

$$y = RAb + n, \qquad (1)$$

$$R = \begin{Vmatrix} 1 & P_{12} & P_{13} & \cdots & P_{1K} \\ P_{21} & 1 & P_{23} & \cdots & P_{2K} \\ \vdots & \vdots & \vdots & \vdots & \vdots \\ P_{KI} & P_{K2} & \cdots & \cdots & 1 \end{Vmatrix}$$

where, $y = (y_1, y_2, \ldots, y_K)^T$ $$A = \begin{Vmatrix} a_1 & 0 & \cdots & 0 \\ 0 & a_2 & \vdots & \vdots \\ \vdots & \vdots & \ddots & \vdots \\ 0 & \cdots & 0 & a_K \end{Vmatrix}$$

$b = (b_1, b_2, \ldots, b_K)^T$ $n = (n_1, n_2, \ldots, n_K)^T$

Where, $a_i$ is a received amplitude of an ith multiuser, A is an amplitude matrix of the received signal, b is a bit vector of a transmitted data, n is a Gaussian noise vector, and an element $P_{ij}$ in the R matrix represents a cross-correlation coefficient between ith and jth user spreading codes.

If an output y from the matched filter block 10 as expressed in equation (1), is provided to the $R^{-1}$ filter 11, an output Z expressed as the following equation (2) can be obtained.

$$Z = R^{-1}y = Ab + R^{-1}n \qquad (2),$$

$$Z = (Z_1, Z_2, \ldots Z_K,)$$

The output Z of the $R^{-1}$ filter 11, expressed as equation (2), sends to the binary data determining part 12 having the binary determiners $DC_1$–$DC_K$ where the binary data of multiuser is recovered.

The background art decorrelating multiuser detector can completely remove the MAI signal caused by the cross-correlation value (not 0) between multiuser's spreading codes and included in the output y of the matched filter 10 by using the $R^{-1}$ filter and thus can improved quality of the received signal, However, the $R^{-1}$ filter is required to compute an inverted matrix of R as shown in the following equation (3). This computation becomes the more complex as the dimension of the matrix becomes the greater as a number of the users increases.

$$R^{-1} = \frac{1}{\det(R)} \begin{Vmatrix} b_{11} & b_{12} & \cdots & b_{1K} \\ b_{21} & b_{22} & \cdots & b_{2K} \\ b_{KI} & b_{K2} & \cdots & b_{KK} \end{Vmatrix} \qquad (3)$$

In this equation (3), the diagonal element $b_{11}$ is expressed as $b_{11}=1-(K-1)(K-2)/2$ second order term of the cross-correlation coefficient+$O(P^3)$, the diagonal element $b_{22}$ is expressed as $b_{11}=1-(K-1)(K-2)/2$ second order term of the cross-correlation coefficients+$O(P^3)$, and the other diagonal elements $b_{ii}$ are expressed in the same manner. The non-diagonal element $b_{12}$ is expressed as $b_{12}=-P_{12}+(K-2)$ second order term of the cross-correlation coefficients+$O(P^3)$ and the non-diagonal element $b_{13}$ is expressed as $b_{13}=-P_{13}+(K-2)$ second order term of the cross-correlation coefficients+$O(P^3)$. The other non-diagonal element $b_{ij}$ is expressed in the same manner. The $O(P^3)$ denotes a polynomial of the cross-correlation coefficients having a third order term and greater. Therefore, the $R^{-1}$ filter has a problem in that a circuit can not be realized actually due to the excessive amount of computation.

SUMMARY OF THE INVENTION

Accordingly, the present invention is directed to a device and method for a multiuser detection in a DS-CDMA system that substantially obviates one or more of the problems due to limitations and disadvantages of the related art.

An object of the present invention is to provide a device and method for a multiuser detection in a DS-CDMA system, which largely reduces an amount of data computation while reducing an MAI so as to be actually applied to the system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for multiuser detection in a DS-CDMA system includes the steps of receiving a band-spread signal by a plurality of spreading codes respectively transmitted by each of multiusers, obtaining a plurality of sampled outputs from each of multiuser's messages by despreading the received signal with a matched filter, obtaining an MAI signal included in the plurality of sampled outputs by applying a minus (−) value of a cross-correlation value between the multiuser's spreading codes to the plurality of sampled outputs, removing the MAI signal from the sampled outputs by subtracting the MAI signal from the sampled outputs, and generating a binary data by comparing the sampled outputs from which the MAI signal is to be removed with a threshold value to recover the multiuser's messages.

In another aspect, a device for a multiuser detection in a DS-CDMA system according to the present invention includes a matched filter for generating sampled outputs of each of multiuser's messages by despreading a received signal from a transmitting portion with the multiuser's spreading code, a linear combiner for removing an MAI signal included in the sampled outputs of each of the multiusers by applying a minus (−) value of a cross-correlation coefficient between the multiuser's spreading codes to the multiuser's sampled outputs, and a binary data determiner for deciding a binary data by comparing each of the outputs from the linear combiner with a threshold value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 is a block diagram illustrating a device for a multiuser detection in a DS-CDMA system according to the present invention.

DETAILED DESCRIPTION OF THE PREFERRED EMBODIMENTS

Reference will now be made in detail to the preferred embodiments of the present invention, examples of which are illustrated in the accompanying drawings.

As shown in FIG. 2, a device for a multiuser detection in a DS-CDMA system according to the present invention includes a matched filter 20 for generating sampled outputs $y_1$–$y_k$ of each of multiuser's messages by despreading the multiuser's received signal r(t) from a transmitting portion with the multiuser's spreading code, a linear combiner 21 for removing an MAI signal included in the sampled outputs $y_1$–$y_k$ by applying a cross-correlation coefficient value between the multiuser's spreading codes to the sampled outputs $y_1$, $y_k$, and a binary data determiner 22 for deciding a binary data by comparing each of the outputs $Z_1$–$Z_k$ from the linear combiner with a threshold value.

Figure 1:
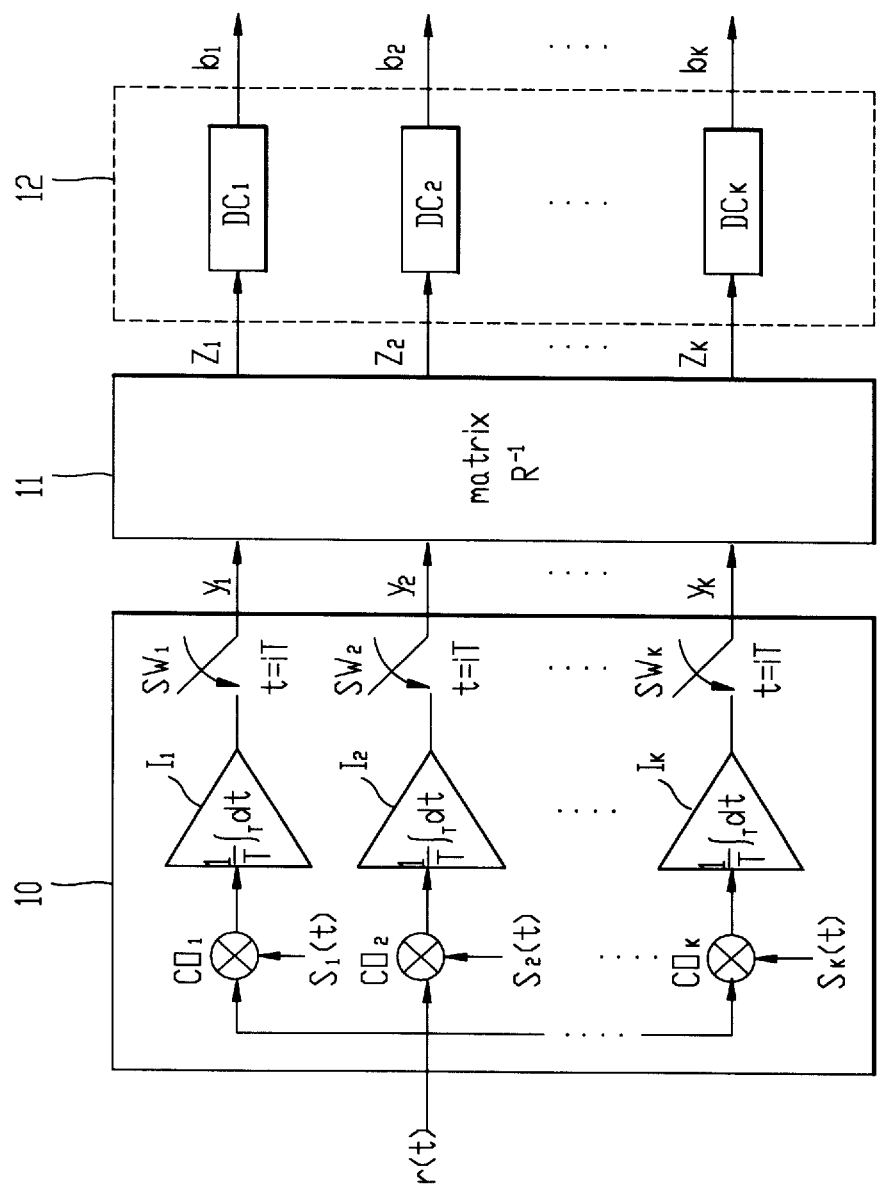
FIG. 1 is a block diagram illustrating a device for a multiuser detection in a DS-CDMA system according to the background art.

Since the matched filter 20 and the binary data determiner 22 are the same as the matched filter 10 and the binary determiner 12 according to the background art as shown in FIG. 1, detailed description thereof will be omitted. Only the linear combiner 21 will be described below.

The linear combiner 21 includes K linear subcombiners $LC_1$–$LC_k$, for generating outputs $Z_1$–$Z_k$ by removing the MAI signal included in each of K sampled outputs $y_1$–$y_k$. Each of the linear subcombiners includes K−1 multipliers $CO_{12}$–$CO_{k2}$ and an adder $AD_1$–$AD_k$.

The linear subcombiners, for example, the linear subcombiner $LC_2$ for generating the output $Z_2$ by removing the MAI signal from the sampled output $y_2$ of the second user is connected to each of the sampled outputs $y_1$–$y_k$ so as to respectively multiply the remaining K−1 sampled outputs $y_1$ and $y_3$–$y_k$ excluding the second sampled output $y_2$ by minus (−) values of the cross-correlation coefficients between the second user's spreading code and the remaining K−1 user's spreading codes.

More described in detail, in case of the second sampled output in which the MAI signal is to be removed, the first sampled output $y_1$ is multiplied by the minus (−) value $-P_{21}$ of the cross-correlation coefficient between the second user's spreading code and the first user's spreading code. The Kth sampled output $y_k$ is multiplied by the minus (−) value $-P_{2K}$ of the cross-correlation coefficient between the second user's spreading code and the Kth user's spreading code. In the same manner, the ith sampled output yi is multiplied by the minus (−) value of the cross-correlation coefficient between the ith user's spreading code and the user's spreading code for generating the sampled output in which the MAI signal is to be removed.

The operation of the device for a multiuser detection in a DS-CDMA system according to the present invention will be described below.

If the received signal r(t) provided by K users from the transmitting portion is input to the multiuser detector, the matched filter 20 despreads the received signal r(t) in the aforementioned manner so as to generate the K sampled outputs $y_1$–$y_K$. The K sampled outputs $y_1$–$y_K$ have a value expressed by the equation (1).

If the sampled outputs $y_1$–$y_K$ are provided to the linear combiner 21, the sampled outputs $Z_1$–$Z_K$ are generated as expressed by the equation (5).

$$Z_1 = y_1 \quad -y_2P_{12} \quad \cdots \quad -y_1P_{1K} \quad (5)$$
$$Z_2 = -y_1P_{21} \quad +y_2 \quad \cdots \quad y_KP$$
$$\vdots \quad \vdots \quad \vdots \quad \cdots \quad \vdots$$
$$Z_K = -y_1P_{K1} \quad -y_2P_{K2} \quad \cdots \quad +y_K$$

The equation (5) can be expressed by the matrix like as the equation (6).

$$\begin{Vmatrix} Z_1 \\ \vdots \\ \vdots \\ Z_K \end{Vmatrix} = \begin{Vmatrix} 1 & -P_2 & \cdots & -P_{1K} \\ -P_{21} & 1 & \cdots & \vdots \\ \vdots & \vdots & \cdots & \vdots \\ -P_{K1} & -P_{K2} & \cdots & 1 \end{Vmatrix} \begin{Vmatrix} y_1 \\ y_2 \\ \vdots \\ y_K \end{Vmatrix} \text{ or } Z = Py \quad (6)$$

In comparison between the equation (6) and the equation (2), it is noted that P corresponds to $R^{-1}$. As can be aware of it from the equation (3), if the cross-correlation coefficients more than a second order term of an inverse matrix $R^{-1}$ for the matrix of the cross-correlation coefficient between the spreading codes of the multiuser are disregarded, it is noted that the inverse matrix $R^{-1}$ is identical to P.

Since the cross-correlation coefficients $P_{ij}$ more than a second order term are much less than 1, $P_{ij} \gg P_{ij}^2$ can be achieved so that the cross-correlation efficients more than a second order term can be disregarded.

Each of the outputs $Z_1$–$Z_K$ of the linear combiner 21 is determined as a binary data of 0 to 1 by the binary data determiner 22 so that each of the multiuser's messages can be recovered.

In the embodiment of the present invention, although only one linear combiner 21 has been used, a predetermined number ot the linear combiner connected in series can be used so as to more efficiently remove the MAI signal.

A method for a multiuser detection in a DS-CDMA system according to the present invention will be described below.

First, a band-spreading signal transmitted by K multiusers is received. The received signal is then despread by using the matched filter to generate the sampled outputs of the messages.

Each of the remaining K−1 sampled outputs excluding the sampled output in which the MAI signal is to be removed is multiplied by each of the cross-correlation value between the spreading codes for generating each of the sampled outputs and the spreading code for generating the sampled output in which the MAI signal is to be removed. Then, the resulting value is subtracted from the sampled output in which the MAI signal is to be removed so as to remove the MAI signal included in the sampled output. In this manner, each of the corresponding MAI signal from the remaining K−1 sampled outputs is removed to generate the sampled outputs $Z_1$–$Z_K$ in which the K MAI signal is removed.

Subsequently, the sampled outputs $Z_1$–$Z_K$ are compared with the threshold value. If the sampled outputs $Z_1$–$Z_K$ are greater than the threshold value, it is determined as a binary data of 1. If the sampled outputs $Z_1$–$Z_K$ are smaller than the threshold value, it is determined as a binary data of 0. As a result, each of the multiuser's bits is simultaneously generated so that the original messages transmitted by K multiusers are recovered.

In the embodiment of the present invention, although the MAI signal is one time removed from each of the sampled outputs, the MAI signal may preferably be removed several times as occasion demands.

Figure 3A:
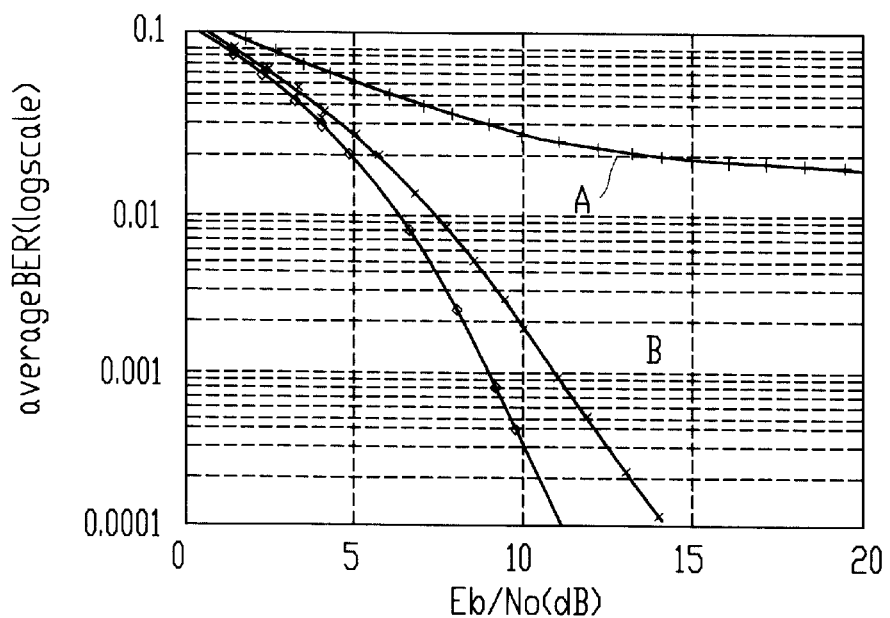
FIGS. 3a and 3b graphs illustrating performance of a device for a multiuser detection according to the background art and the present invention.
Figure 3B:
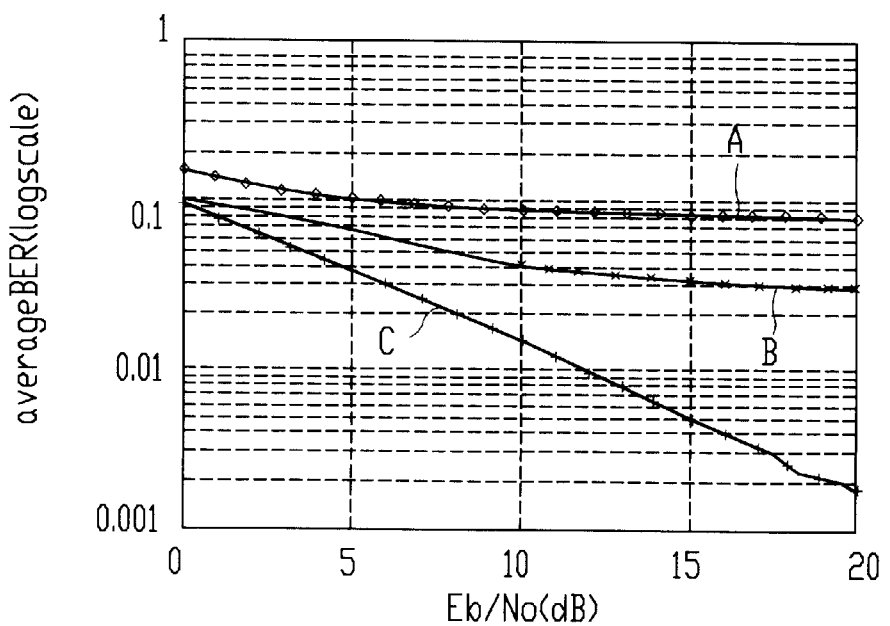

FIGS. 3a and 3b show performance of a device for a multiuser detection in a DS-CDMA system, in which the length of the spreading code is $2^{13-1}$, processing gain is 31, and the multiusers K are 10. FIGS. 3a and 3b show the simulation result for an average bit error rate (BER) of Eb/NO (dB) in ideal power control and in Raily fading, respectively, in which A is a comventional multiuser detector having a matched filter block 10 in FIG. 1, B is a multiuser detector (including one linear combiner) according to the present invention, and C is a virtual multiuser detector having an inverse matrix $R^1$ filter which is ideal but impossible to realize. Although the device for a multiuser detection of the present invention is not superior to the virtual multiuser detector, it has much more excellent performance than the conventional device for a multiuser detection.

As aforementioned, the device and method for a multiuser detection in a DS-CDMA system according to the present invention has the following advantages.

To remove the MAI signal included in each of the sampled outputs, the minus (−) value of the cross-correlation coefficient between the spreading codes of each of the multiusers is applied to the sampled outputs of each of the multiuser's messages generated by despreading the received signal with the spreading codes of each of the multiusers. Thus, the MAI signal included in each of the sampled outputs can be almost removed so that BER can largely be reduced, thereby increasing user capacity when applying the present invention to the conventional CDMA systems and simply removing the MAI signal.

It will be apparent to those skilled in the art that various modifications and variations can be made in the device and method for a multiuser detection in a DS-CDMA system according to the present invention without departing from the spirit or scope of the invention. Thus, it is intended that the present invention covers the modifications and variations of the invention provided they come within the scope of the appended claims and their equivalents.

What is claimed is:

1. A method for a multiuser detection in a DS-CDMA system, comprising:

receiving a band-spread signal by a plurality of spreading codes respectively transmitted by each of multiusers;

obtaining a plurality of sampled outputs from each of multiuser's messages by despreading the received signal with a matched filter;

obtaining an MAI signal included in the plurality of sampled outputs by applying a minus (−) value of a cross-correlation value between the multiuser's spreading codes to the plurality of sampled outputs;

removing the MAI signal from the sampled outputs by subtracting the MAI signal from the sampled outputs; and generating a binary data by comparing the sampled outputs from which the MAI signal is removed with a threshold value to recover the multiuser's messages.

2. The method as claimed in claim 1, wherein the step of removing the MAI signal includes the step of obtaining the MAI signal by the cross-correlation value included in the sampled output of a selected one of the multiusers, comprising:

multiplying the sampled outputs of each of the multiusers by a minus (−) value of each of the cross-correlation values between the selected multiuser's spreading codes and remaining multiuser's spreading codes; and adding respective resulting multiplied values.

3. The method as claimed in claim 1, wherein the step of removing the MAI signal repeats a predetermined number of times.

4. A device for a multiuser detection in a DS-CDMA system, comprising:
- a matched filter for generating sampled outputs of each of multiuser's messages by despreading a received signal from a transmitting portion using each of corresponding multiuser's spreading codes;
- a linear combiner for removing an MAI signal included in the sampled outputs by applying a minus (−) value of a cross-correlation coefficient between the multiuser's spreading codes to the multiuser's sampled outputs; and
- a binary data determiner for deciding a binary data by comparing each of the outputs from the linear combiner with a threshold value.

5. The device as claimed in claim 4, wherein the linear combiner provides a filtering circuit of the MAI signal for each of the sampled outputs of the matched filter, wherein each of the filtering circuits comprises:
- a plurality of multipliers for multiplying the minus (−) value of a corresponding one of the cross-correlation coefficients by a corresponding one of the sampled outputs excluding one selected sampled output in which the MAI signal is to be removed; and
- an adder for adding the selected one of the sampled outputs to outputs of the plurality of multipliers.

6. The device as claimed in claim 4, further comprising two or more linear combiners connected to one another in series.

7. A method for a multiuser detection in a DS-CDMA system, comprising:
- receiving a band-spread signal by K spreading codes respectively transmitted by each of K multiusers;
- obtaining sampled outputs each from one of K multiusers messages by despreading the received signal with a matched filter;
- reducing a MAI signal included in each of the sampled outputs by subtracting the MAI signal from the sampled outputs to generate filtered sampled outputs, wherein the reducing step for a selected sampled output comprises:
  - multiplying at least one remaining sampled outputs excluding the selected sampled output by a corresponding cross-correlation coefficient between spreading codes for said at least one remaining sampled outputs and a spreading code for the selected sampled output to generate at least one resulting value, and
  - subtracting the at least one resulting value from the selected sampled output to generate one of the filtered sampled outputs; and
- generating a binary data by comparing the filtered sampled outputs with a threshold value.

8. The method of claim 7, wherein the at least one remaining sampled outputs are equal to K−1 in number, and wherein the generating step recovers the K multiusers messages.

9. The method of claim 7, wherein the reducing the MAI signal step repeats a predetermined number of times.

* * * * *